(12) United States Patent
Kennedy

(10) Patent No.: US 10,619,782 B2
(45) Date of Patent: Apr. 14, 2020

(54) BREAKER CLAMP FOR FIRE HYDRANT

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

( * ) Notice: Subject to any disclaimer, the term of this patent is extended or adjusted under 35 U.S.C. 154(b) by 0 days.

(21) Appl. No.: 15/934,125

(22) Filed: Mar. 23, 2018

(65) Prior Publication Data
US 2019/0293221 A1  Sep. 26, 2019

(51) Int. Cl.
| | |
|---|---|
| *F16K 17/36* | (2006.01) |
| *F16L 55/10* | (2006.01) |
| *F16K 27/00* | (2006.01) |
| *F16K 17/40* | (2006.01) |
| *F16B 31/02* | (2006.01) |
| *F16L 23/036* | (2006.01) |

(52) U.S. Cl.
CPC ........ *F16L 55/1007* (2013.01); *F16K 17/406* (2013.01); *F16K 27/006* (2013.01); *F16B 31/02* (2013.01); *F16L 23/036* (2013.01)

(58) Field of Classification Search
CPC ... F16L 55/1007; F16K 17/406; F16K 27/006
USPC ......... 137/68.14; 285/2, 116, 406, 414, 415, 285/421
See application file for complete search history.

(56) References Cited

U.S. PATENT DOCUMENTS

| | | | | |
|---|---|---|---|---|
| 1,093,868 | A * | 4/1914 | Leighty ................... | F16L 19/04 123/193.3 |
| 2,166,412 | A * | 7/1939 | Kiesel ...................... | E03B 9/02 285/2 |
| 2,249,848 | A * | 7/1941 | O'Brien .................... | E03B 9/02 137/272 |
| 2,340,965 | A * | 2/1944 | Kiesel ...................... | E03B 9/02 137/294 |
| 2,417,025 | A * | 3/1947 | Volpin ................... | F16L 37/113 285/91 |
| 2,821,415 | A * | 1/1958 | Race, Jr. .................. | F16L 17/04 285/112 |
| 3,329,446 | A * | 7/1967 | Katis ....................... | F16L 17/04 285/112 |
| 3,680,894 | A * | 8/1972 | Young ..................... | F16L 17/04 285/112 |
| 3,899,196 | A * | 8/1975 | Dashner .................... | E03B 9/04 285/2 |

(Continued)

*Primary Examiner* — Minh Q Le
(74) *Attorney, Agent, or Firm* — Brown & Michaels, PC

(57) ABSTRACT

A breaker clamp member includes a curved body shaped to fit around a portion of an upper portion of a fire hydrant and a portion of a lower portion of the fire hydrant at a joint between the upper portion of the fire hydrant and the lower portion of the fire hydrant. The breaker clamp member also includes at least one connection element extending from the body to connect the breaker clamp member with at least one other breaker clamp member. The breaker clamp member also includes an upper rim protruding from the body and a lower rim protruding from the body. The upper protruding rim, the lower protruding rim, and the body define a concavity therebetween, the concavity being configured to receive the first ledge and the second ledge. In another embodiment, a breaker clamp includes two breaker clamp members.

19 Claims, 3 Drawing Sheets

(56) References Cited

U.S. PATENT DOCUMENTS

| | | | | |
|---|---|---|---|---|
| 3,977,705 | A * | 8/1976 | Thiessen | F16L 17/073 |
| | | | | 285/112 |
| 4,390,038 | A * | 6/1983 | Salvato | E03B 9/02 |
| | | | | 137/296 |
| 4,640,533 | A * | 2/1987 | Klemm | F16L 27/12 |
| | | | | 285/62 |
| 4,896,902 | A * | 1/1990 | Weston | F16L 17/04 |
| | | | | 285/112 |
| 5,509,702 | A * | 4/1996 | Warehime | F16L 23/10 |
| | | | | 24/279 |
| 5,803,110 | A * | 9/1998 | Segal | E03B 9/02 |
| | | | | 137/305 |
| 6,626,466 | B1 * | 9/2003 | Dole | F16L 17/04 |
| | | | | 285/112 |
| 6,692,041 | B1 * | 2/2004 | Coulas, Sr. | F16L 23/024 |
| | | | | 138/109 |
| 7,922,218 | B2 * | 4/2011 | Maier | F04D 29/624 |
| | | | | 285/406 |
| 2010/0148493 | A1 * | 6/2010 | Madara | F16L 17/025 |
| | | | | 285/24 |

* cited by examiner

BREAKER CLAMP FOR FIRE HYDRANT

BACKGROUND OF THE INVENTION

Field of the Invention

The invention disclosed herein pertains to the field of fire hydrants. More particularly, the invention pertains to improved safety features to facilitate clean separation of an upper, above-ground portion of a fire hydrant assembly from a lower portion or standpipe, and reduce, minimize, and/or prevent damage of a fire hydrant in the event of impact by a vehicle or other object.

Description of Related Art

Fire hydrant assemblies often include a breaker element that activates (e.g., breaks or separates) as a result of impact from another object, such as, for example, a vehicle that collides with a fire hydrant. The breaker element ordinarily fastens an upper portion (e.g., an upper barrel) of the fire hydrant assembly to a lower portion (e.g., a lower barrel), or to a standpipe, but releases the upper portion upon activation by impact on the fire hydrant. Allowing the upper portion of the fire hydrant to disengage or break away from the lower portion or standpipe reduces damage to the object impacting the fire hydrant, reduces the chance or severity of injury to persons operating the object, reduces or prevents damage to the fire hydrant or its internal components, and reduces or prevents loss of water. Breaker elements are installed during initial installation of the fire hydrant, or during repair or reinstallation of a fire hydrant that has been impacted or intentionally dismantled.

One example of a breaker element is a breaker flange which includes a continuous ring with a snap ring. Another breaker element includes two member-moon safety flange rings that can be secured together around a hydrant to secure the upper portion and the lower portion of the hydrant. This breaker element relies on friction to keep the safety flange rings correctly located. Upon vehicular impact, the safety flange ring is intended to fracture to facilitate clean separation of the upper portion of the fire hydrant assembly from the lower portion or standpipe. After impact, repair of the fire hydrant typically requires installation of a new breaker element.

Conventional breaker elements are difficult to position and install properly. For proper installation, these breaker elements require alignment in conjunction with the upper and lower portions of the fire hydrant, and it can be difficult to position each part properly. Further, at least in part because a ledge or flange on the upper barrel of the fire hydrant is often tapered or beveled at an angle usually of about 15 degrees, the breaker rings engaging these flanges can slide out of place, or bend. Deformation or slippage of the breaker rings also reduces their clamping efficiency.

SUMMARY OF THE INVENTION

In one embodiment, a breaker clamp member is provided to clamp an upper portion of a fire hydrant to a lower portion of a fire hydrant. The fire hydrant includes an upper portion and a lower portion, the upper portion having a bottom with a first ledge and the lower portion having a top with a second ledge. The breaker clamp member includes a curved body, at least one connection element, an upper rim protruding from the body, and a lower rim protruding from the body. The body is shaped to fit around a portion of the upper portion of the fire hydrant and a portion of the lower portion of the fire hydrant at a joint between the upper portion of the fire hydrant and the lower portion of the fire hydrant. The at least one connection element extends from the body and can connect the breaker clamp member with at least one other breaker clamp member. The upper protruding rim, the lower protruding rim, and the body define a concavity therebetween, the concavity configured to receive the first ledge and the second ledge.

In another embodiment, a breaker clamp is provided that includes two curved breaker clamp members shaped to fit around the upper portion of the fire hydrant and the lower portion of the fire hydrant at the joint between the upper portion of the fire hydrant and the lower portion of the fire hydrant.

DETAILED DESCRIPTION OF THE INVENTION

Figure 1:
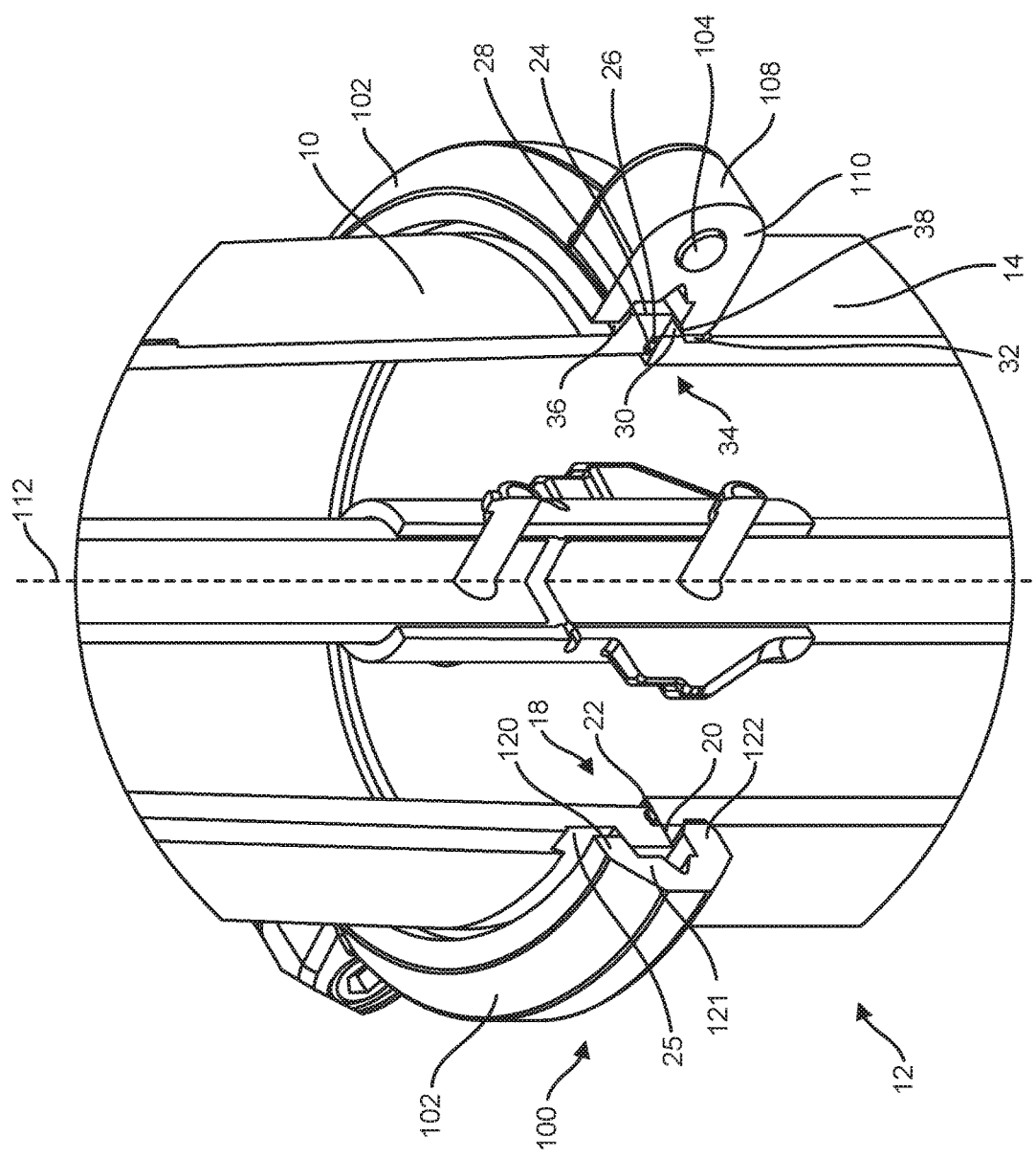
FIG. 1 shows an isometric sectional view of a breaker clamp installed on a fire hydrant, according to an embodiment of the invention.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the terms "axial" and/or "axially" refer to the relative position/direction of objects along a center axis or axis of symmetry. As further used herein, the terms "radial" and/or "radially" refer to the relative position/direction of objects along a radius from the center axis or axis of symmetry. Additionally, the terms "circumferential" and/or "circumferentially" refer to the relative position/direction of objects along a circumference which surrounds the center axis or axis of symmetry, but does not at any location intersect the center axis or axis of symmetry.

As discussed above, an above-ground portion of a fire hydrant assembly can be subject to impact, which can damage both the fire hydrant assembly and any object impacting the fire hydrant assembly. A breaker clamp is disclosed herein to facilitate disengagement of the above-ground portion from a lower portion, a below-ground portion, or a stand-pipe. The disengagement reduces or prevents damage to the fire hydrant assembly, the object impacting the fire hydrant, or any operator of the object. Further, the ease and quality of installation of the breaker clamp is improved compared to that of conventional breaker clamps or straps.

FIG. 1 shows a sectional isometric view of a breaker clamp 100 clamping an upper barrel 10 of a fire hydrant 12 to a lower barrel 14 of the fire hydrant 12. A lower end 18 of the upper barrel 10 includes a mating surface 20 to mate with a mating surface 22 of the lower barrel 14. An upper flange 24, upon which the breaker clamp 100 can clamp, can extend radially and annularly (i.e., circumferentially or partially circumferentially) at the lower end 18 of the upper barrel 10. The upper flange 24 can protrude radially from the surface of the lower end 18 of the upper barrel 10, and the upper flange 24 can extend the mating surface 20 of the upper barrel 10, and/or the upper flange 24 can be created by cutting an annularly extending slot 25 into the lower end 18 of the upper barrel 10 adjacent the desired location of the upper flange 24. The mating surface 20 of the upper barrel 10 can define a recess 26, which can receive, or partially receive, an O-ring 28 to create a seal between the upper barrel 10 and the lower barrel 14.

A lower flange 30, upon which the breaker clamp 100 can clamp, can extend radially and annularly (i.e., circumferentially or partially circumferentially) at an upper end 34 of the lower barrel 14. The lower flange 30 can protrude radially from the surface of the upper end 34 of the lower barrel 14, and the lower flange 30 can extend the mating surface 22 of the lower barrel 104 and/or the lower flange 30 can be created by cutting an annularly extending slot 32 into upper end 34 of the lower barrel 14 adjacent the desired location of the lower flange 30. The breaker clamp 100 can clamp the upper barrel 10 to the lower barrel 14 and create the seal, by engaging with the upper flange 24 and the lower flange 30.

Figure 2:
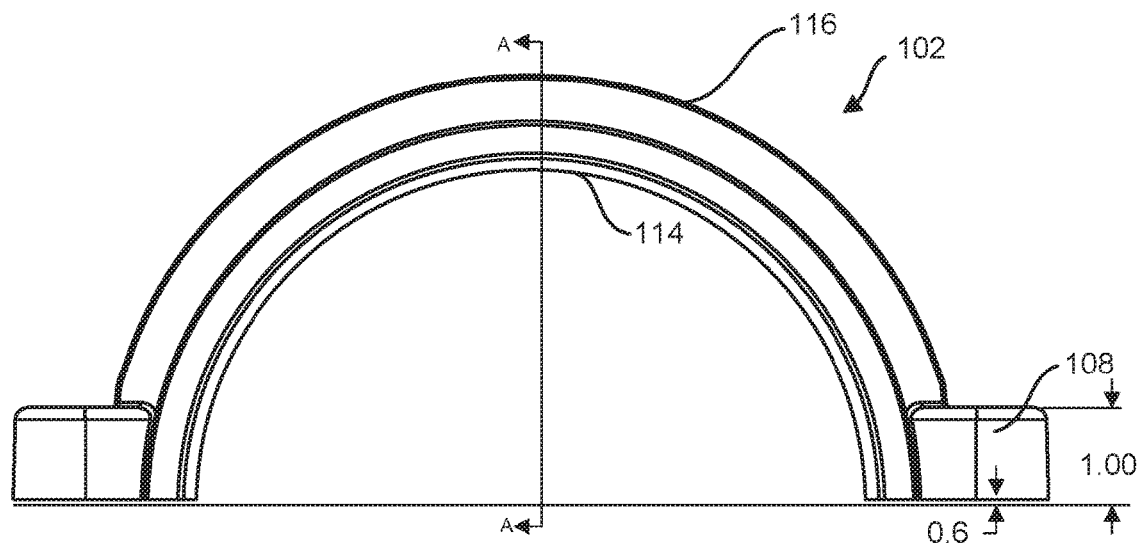
FIG. 2 shows a top view a breaker clamp member of FIG. 1.
Figure 3:
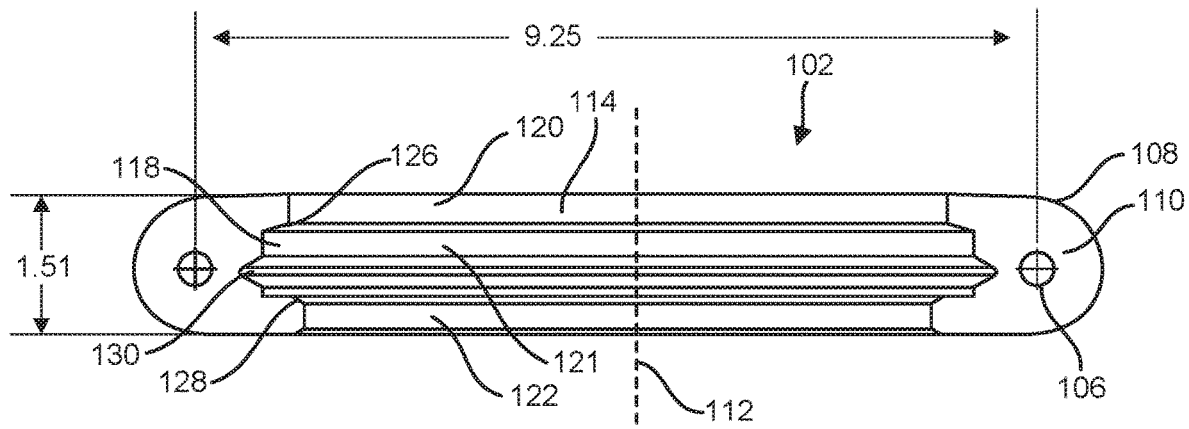
FIG. 3 shows a side view of the breaker clamp member of FIG. 2.
Figure 4:
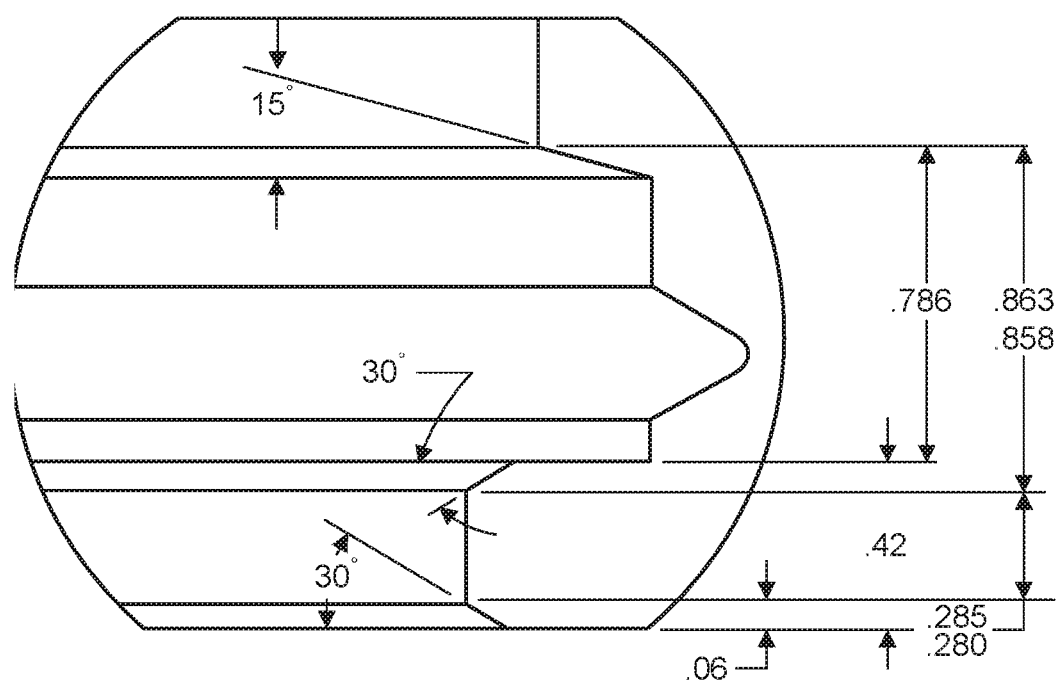
FIG. 4 shows a detailed view of a portion of the breaker clamp member of FIG. 3.
Figure 5:
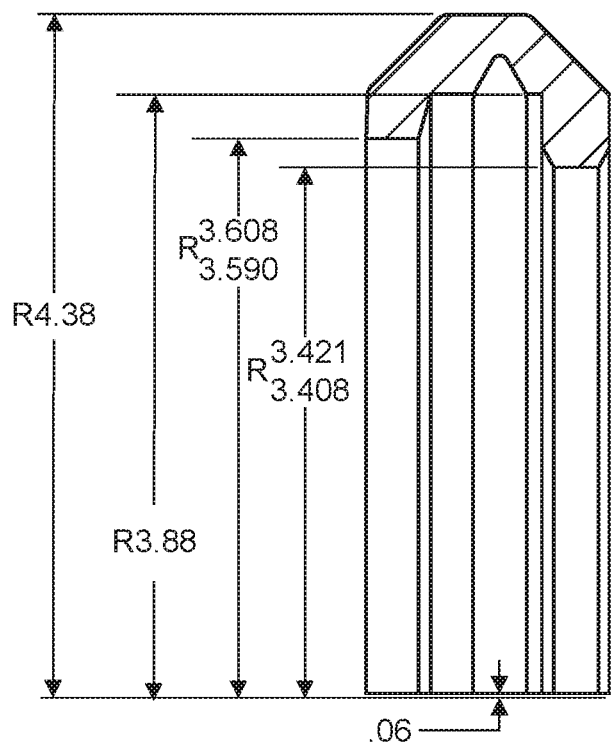
FIG. 5 shows a cross-sectional side view of the breaker clamp member of FIG. 2.

FIG. 2 shows a top view of a breaker clamp member 102, FIG. 3 shows a side view of the breaker clamp member 102, FIG. 4 shows a detailed view of a portion of the breaker clamp member 102, and FIG. 5 shows a cross-sectional side view of the breaker clamp member 102. The breaker clamp member 102 can be made of cast iron, steel, or another metal. Referring to FIGS. 1-5, the breaker clamp 100 includes two of the breaker clamp members 102 to fully encompass a circumference or perimeter of a fire hydrant. The two breaker clamp members 102 can be fastened together with fasteners, such as bolts 104 (see FIG. 1) through fastener holes 106. Other fasteners can also be used, such as, but not limited to, screws, rivets, or clips. The assembled breaker clamp 100 can be separated or broken apart by a predetermined threshold force. The breaker clamp 100 is sized and shaped to fit around the joint between an upper portion of a fire hydrant system and a lower portion of a fire hydrant system, such as the upper barrel 10 and the lower barrel 14. As fire hydrants are generally cylindrical, the breaker clamp 100 has a similar curve that generally matches the exterior shape of the fire hydrant at the joint between the upper barrel 10 and the lower barrel 14. Accordingly, each breaker clamp member 102 extends 180 degrees, approximately 180 degrees, or slightly shy of 180 degrees between two connection flanges 108. The connection flanges 108 can have faces 110 that are coplanar, or approximately coplanar, such that when two breaker clamp members 102 are positioned to form a fully annular breaker clamp 100, the faces 110 of one breaker clamp member 102 mate against the faces 110 of the other breaker clamp member 102. The faces 110 can be coplanar with a center axis 112 (e.g., axis of symmetry) of the breaker clamp 100, or alternatively, when the breaker clamp members 102 extend slightly shy of 180 degrees, as shown in FIG. 2, the faces 110 can be coplanar with a plane parallel with and slightly offset from a plane containing the center axis 112. The offset O can vary. In one example, the offset O is 0.06 inches (1.524 mm). In this alternative, the breaker clamp member 102 would extend slightly short of 180 degrees, allowing room for the breaker clamp members 102 to tighten around the fire hydrant 12. While the faces 18 are shown to be flat in the figures, and while it is noted that a flat mating surface can facilitate a soundly mated connection between two breaker rings 102, it is also noted that the faces 18 are not limited to any particular shape or texture.

The breaker clamp member 102 has an internal side 114 and an external side 116. The internal side 114 faces the fire hydrant 12 during use, and the external side 116 faces away from the fire hydrant 12 during use. The internal side 114 forms a concavity 118, defined in part by an upper protruding rim 120, a body 121, and a lower protruding rim 122. The lower rim 120 and the upper rim 122 each extend from the body 121. The concavity 118 can receive the upper flange 24 and/or the lower flange 30. The upper protruding rim 120 can abut and press upon the upper flange 124, and the lower protruding rim 122 can be inserted into the slot 32 in the lower barrel 14, and can abut and press upon the lower flange 30.

An upper surface or upper ledge 36 of the upper flange 24 can be angled off perpendicular with the center axis 112, toward the lower barrel 14, moving radially outward. An internal upper surface 126 of the upper protruding rim 120 can be angled at a similar, equal, or corresponding degree, to mate with the upper surface 36 of the upper flange 24. In the illustrated embodiment of FIG. 1, though not intended to be limiting, the upper surface 36 of the upper flange 24 is angled about 15 degrees, and the internal upper surface 126 of the upper protruding rim 120 is angled an equal approximate 15 degrees from a line perpendicular to the center axis 112.

The lower protruding rim 122 can be generally shaped to correspond with and fit within the slot 32 in the lower barrel 14, and to lock the lower protruding rim 122 from moving axially when two breaker clamp members 102 are tightened together. In the illustrated embodiment, the width of the slot 32 in the lower barrel 14 tapers in a depth-wise direction of the slot 32. This taper creates a lower surface or lower ledge 38 of the lower flange 30 that is also angled off perpendicular with the center axis 112, and angled toward the upper barrel 10 moving radially outward. An internal upper surface 128 of the lower protruding rim 122 can be angled at a similar, equal, or corresponding degree, to mate with the lower surface 38 of the lower flange 30.

Further, the taper of the slot 32 creates a lower surface or ledge 39 of the slot 32 that is also angled off perpendicular with the center axis 112—the lower surface 39 of the slot 32 being angled away from the upper barrel 10 moving radially outward along the lower surface 39 of the slot 32. An internal lower surface 129 of the lower protruding rim 122 can be angled at a similar, equal, or corresponding degree, to mate with the lower surface 39 of the slot 32. This lower surface 39 of the slot 32 provides more stability to the engagement between the breaker clamp member 102 and the fire hydrant 12. The lower protruding rim 122 can be positioned and supported more strongly, for example, from above and below, such that two breaker clamps 102 can be fastened around a fire hydrant with engagement of the breaker clamps 102 and the fire hydrant through only the lower protruding rim 120 and the slot 32. Locking the lower protruding rim 122 in place in this fashion facilitates breakage of the breaker clamp members 102 in the desired manner during impact on the fire hydrant 12. The minimum wall thickness of the breaker clamp member 102 can also be increased (and still achieve proper breakage during impact), to address corrosion concerns and extend longevity of the parts.

A span of the concavity 118 between the upper rim 120 and the lower rim 122 is such that when two breaker clamp members 102 are being fastened around the fire hydrant 12, with the lower rim 122 positioned to mate with the slot 32, lower surface 38 of the lower barrel 14, and/or the second lower surface 39 of the lower barrel 14, the upper rim 120 will abut and press over upper flange 24, sliding along the upper surface 36 and pressing the upper flange 24 and upper barrel 10 axially against the lower barrel 14. The lower rim 122 can also press into the slot 32 of the lower barrel 14, with any radially inward movement of the lower rim 122 including the internal upper surface 128 sliding over the lower surface 38 of the lower flange 30 and/or the internal lower surface 129 sliding over the lower surface 39 of the slot 32.

Relative to conventional breaker elements, the breaker clamp members 102 are easily placed in position around the joint of the upper barrel 10 and lower barrel 14, with the lower rim 122 in the slot 32 of the lower barrel 14. The two breaker clamp members 102 are then relatively easily tightened together using fasteners at the connection flanges. Equal pressure is applied on the upper flange 24 around the circumference of the upper flange 24, and on the lower surface 38 of the lower flange 30, which facilitates axial alignment of the upper barrel 10 and the lower barrel 14, and avoids deformation of the breaker clamp 100.

In the valley of the concavity 118, an annular notch 130 can be formed. The notch 130 can be shaped like a "v". The notch 130 can offer a weak point along which the breaker clamp 100 can break under a threshold force, such as would be generated and/or exceeded as the result of vehicular impact. Impact with the fire hydrant 12 exerting force on the upper barrel 10 relative to the lower barrel can cause the portion of the breaker clamp 100 above the notch 130 to peel away from the portion of the breaker clamp 100 below the notch 130. This response is improved and/or facilitated by engagement of the internal upper surface 128 of the lower protruding rim 122 with the lower surface 38 of the lower flange 30, and the internal lower surface 129 of the lower protruding rim 122 with the lower surface 39 of the slot 32, locks the lower rim 122 in the slot 32.

The external side 116 of the breaker clamp 100 can be shaped variously for cosmetic appearance, structural strength, and manufacturing ease.

Some examples of dimensions (in inches) for the breaker clamp 100 are shown in FIGS. 2-5. However, the breaker clamp 100 can have different dimensions than those shown in these figures, depending in part upon the fire hydrant 12 with which the breaker clamp 100 is used. While a specific design for a fire hydrant 12 is shown in the figures, other fire hydrant models that use a breaker clamp to withstand vehicular or other impacts could use the breaker clamp 100 described herein.

Although O-rings and gaskets are described herein to provide seals between mating surfaces in the fire hydrant 12, other alternative mechanical seals known in the art may be used.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A breaker clamp member to clamp an upper portion of a fire hydrant to a lower portion of a fire hydrant, wherein the fire hydrant comprises an upper portion and a lower portion, the upper portion having a bottom with a first ledge and the lower portion having a top with a second ledge, the second ledge of the lower portion of the fire hydrant being defined by a slot, the slot defining a third ledge opposite the second ledge, the breaker clamp member comprising:

a curved body shaped to fit around a portion of the upper portion of the fire hydrant and a portion of the lower portion of the fire hydrant at a joint between the upper portion of the fire hydrant and the lower portion of the fire hydrant;

at least one connection element to connect the breaker clamp member with at least one other breaker clamp member, the at least one connection element extending from the curved body;

an upper rim protruding from the curved body and having a clamping surface; and a lower rim protruding from the curved body, the lower rim having a first clamping surface and a second clamping surface opposite the first clamping surface, the upper protruding rim, the lower protruding rim, and the curved body defining a concavity therebetween, the concavity configured to receive the first ledge and the second ledge, the clamping surface of the upper rim being configured to abut the first ledge as a result of installation on the fire hydrant, the first clamping surface of the lower rim being configured to abut the second ledge as a result of installation on the fire hydrant, the second clamping surface of the lower rim being configured to abut the third ledge as a result of installation on the fire hydrant.

2. The breaker clamp member of claim 1, wherein the at least one connection element is a connection flange with a mating face to mate with another connection flange.

3. The breaker clamp member of claim 1, wherein the at least one connection element includes two connection elements, wherein each connection element includes a connection flange with a mating face to mate with another connection flange, and wherein the mating faces are coplanar.

4. The breaker clamp member of claim 1, wherein the at least one connection element has a fastener hole configured to accept a fastener element to tighten together two breaker clamp members.

5. The breaker clamp of claim 1, wherein the breaker clamp further comprises a center axis, wherein the clamping surface of the upper rim is angled away from perpendicular with the center axis to mate with the first ledge, and wherein the first clamping surface of the lower rim is angled away from perpendicular with the center axis to mate with the second ledge.

6. The breaker clamp of claim 1, wherein the breaker clamp further comprises a center axis, and wherein the second clamping surface of the lower rim is angled away from perpendicular with the center axis to mate with the third ledge.

7. The breaker clamp of claim 1, wherein a span across the concavity from the upper rim to the lower rim increases moving from a valley of the concavity to an open end of the concavity.

8. The breaker clamp of claim 1, wherein the concavity has a V-shaped valley to create a seam where the breaker clamp can break under force exceeding a threshold amount.

9. A breaker clamp to clamp an upper portion of a fire hydrant to a lower portion of a fire hydrant, wherein the fire hydrant comprises an upper portion and a lower portion, the upper portion having a bottom with a first ledge and the lower portion having a top with a slot, the slot including a second ledge and a third ledge opposite the second ledge, the breaker clamp comprising:

two curved breaker clamp members shaped to fit around the upper portion of the fire hydrant and the lower portion of the fire hydrant at a joint between the upper portion of the fire hydrant and the lower portion of the fire hydrant, the two curved breaker clamp members including a center axis when installed around the fire hydrant, the two curved breaker clamp members each further including:
a curved body;
two connection elements to connect the two curved breaker clamp members to each other;

an upper rim protruding from the curved body, the upper rim including a first clamping surface configured to abut the first ledge; and a lower rim protruding from the curved body, the lower rim including a second clamping surface and a third clamping surface opposite the second clamping surface, the second clamping surface configured to abut the second ledge as a result of installation on the fire hydrant, the third clamping surface configured to abut the third ledge as a result of installation on the fire hydrant, the upper rim, the lower rim, and the curved body defining a concavity therebetween, the concavity configured to receive the first ledge and the second ledge, all surfaces of the upper rim outside the concavity configured to be exposed and avoiding contact with any surface of the fire hydrant when installed on the fire hydrant.

10. The breaker clamp of claim 9, wherein the first clamping surface is angled away from perpendicular with the center axis to mate with the first ledge, wherein the second clamping surface is angled away from perpendicular with the center axis to mate with the second ledge, and wherein the third clamping surface is angled away from perpendicular with the center axis to mate with the third ledge.

11. The breaker clamp of claim 9, wherein at least one of the two connection elements of each breaker clamp member comprises a connection flange with a mating face to mate with another connection flange.

12. The breaker clamp of claim 9, wherein each of the two connection elements of each breaker clamp member comprises a connection flange with a mating face to mate with another connection flange, and the mating faces on each breaker clamp member are coplanar.

13. The breaker clamp of claim 9, wherein at least one of the two connection elements has a fastener hole configured to accept a fastener element to tighten together two breaker clamp members.

14. The breaker clamp of claim 9, wherein the breaker clamp further comprises a center axis, wherein the clamping surface of the upper rim is angled away from perpendicular with the center axis to mate with the first ledge, and wherein the first clamping surface of the lower rim is angled away from perpendicular with the center axis to mate with the second ledge.

15. The breaker clamp of claim 14, wherein the breaker clamp further comprises a center axis, and wherein the second clamping surface of the lower rim is angled away from perpendicular with the center axis to mate with the third ledge.

16. The breaker clamp of claim 9, wherein a span across the concavity from the upper rim to the lower rim increases moving from a valley of the concavity to an open end of the concavity.

17. The breaker clamp of claim 9, wherein the concavity has a V-shaped valley to create a seam where the breaker clamp can break under force exceeding a threshold amount.

18. The breaker clamp of claim 9, wherein the lower rim protrudes farther radially inward than the upper rim.

19. The breaker clamp of claim 9, wherein the lower rim has a smaller innermost diameter than the upper rim.

* * * * *